(12) United States Patent  
Hayata et al.

(10) Patent No.: US 6,603,527 B1
(45) Date of Patent: Aug. 5, 2003

(54) LIQUID CRYSTAL DISPLAY DEVICE

(75) Inventors: Hiroko Hayata, Mobara (JP); Mitsuru Goto, Chiba (JP); Hideaki Abe, Mobara (JP); Satoshi Namiki, Misaki (JP)

(73) Assignees: Hitachi, Ltd., Tokyo (JP); Hitachi Device Engineering Co., Ltd., Mobara (JP)

( * ) Notice: Subject to any disclaimer, the term of this patent is extended or adjusted under 35 U.S.C. 154(b) by 215 days.

(21) Appl. No.: 09/707,820

(22) Filed: Nov. 8, 2000

(30) Foreign Application Priority Data

Nov. 11, 1999 (JP) .......................................... 11-321304

(51) Int. Cl.⁷ ............................................ G02F 1/1336
(52) U.S. Cl. ....................................... 349/152; 349/149
(58) Field of Search ................................ 349/149, 150, 349/152; 174/254

(56) References Cited

U.S. PATENT DOCUMENTS 5,016,986 A * 5/1991 Kawashima et al. ........ 349/138
6,059,624 A * 5/2000 Dehaine et al. .............. 228/104
6,104,619 A * 8/2000 Shigehiro .................... 257/668
6,128,063 A * 10/2000 Uchiyama et al. ........... 349/150
6,396,557 B1 * 5/2002 Tajima ........................ 257/676
6,407,796 B2 * 6/2002 Tajima et al. ................ 349/150

* cited by examiner

Primary Examiner—James Dudek
(74) Attorney, Agent, or Firm—Antonelli, Terry, Stout & Kraus, LLP

(57) ABSTRACT

A liquid crystal display device is provided with a driver circuit which can cope with an increase in the number of pixels per device. The liquid crystal display device has signal lines for driving individual pixels and a driver circuit connected to the signal lines, on a liquid-crystal-side surface of either one of substrates disposed to oppose each other with a liquid crystal interposed therebetween. The driver circuit includes a film substrate, interconnection layers formed on a surface of the film substrate, and a semiconductor chip mounted on the film substrate, and bumps are formed on the semiconductor chip inwardly of the periphery thereof. Some of the interconnection layers are connected to the bumps of the semiconductor chip, and then run under the semiconductor chip and extend to the periphery of the film substrate.

6 Claims, 8 Drawing Sheets

LIQUID CRYSTAL DISPLAY DEVICE

BACKGROUND OF THE INVENTION

The present invention relates to a liquid crystal display device and, more particularly, to an improvement in a driver circuit thereof.

An active matrix type of liquid crystal display device has transparent substrates disposed to oppose each other with a liquid crystal interposed therebetween, gate signal lines disposed on a liquid-crystal-side surface of one of the transparent substrates in such a manner as to be extended in the x direction and to be juxtaposed in the y direction, and drain signal lines disposed on the liquid-crystal-side surface in such a manner as to be extended in the y direction and juxtaposed in the x direction. Areas surrounded by the adjacent gate signal lines and the adjacent drain signal lines are formed as pixel areas. Each of the pixel areas is provided with a switching element driven by the supply of a scanning signal from the corresponding one of scanning signal lines and a pixel electrode to which a video signal is supplied from one of the video signal lines via the switching element.

A scanning signal driver circuit for supplying scanning signals to the respective gate signal lines and a video signal driver circuit for supplying video signals to the respective drain signal lines are mounted, and each of these driver circuits is made of a semiconductor device (IC) mounted on one of the transparent substrates.

This semiconductor device is formed by so-called tape carrier bonding, and is formed by preparing a film substrate having a hole formed in its central portion except its periphery, forming interconnection layers on at least one surface of the film substrate so that the interconnection layers are extended from the hole to the periphery, positioning a semiconductor chip in the hole, and bonding each bump of the semiconductor chip to one end (terminal) of the corresponding one of the interconnection layers which are formed to protrude into the hole.

Incidentally, this semiconductor device, for example, a video signal driver circuit (similarly to a scanning signal driver circuit) includes drain signal lines the plural adjacent ones of which are grouped, and plural semiconductor devices which supply video signals to the respective grouped drain signal lines.

With the recent increase in the number of pixels per liquid crystal display device, the number of gate signal lines and drain signal lines per device has also increased, and the number of bumps of the above-described semiconductor device has had to be increased.

It has been pointed out that, in this case, the semiconductor chip has a shape in which the length of the semiconductor chip in the juxtaposition direction of signal lines connected thereto is larger than the widthwise length of the semiconductor chip, so that during the formation of semiconductor chips on a surface of one semiconductor wafer by so-called step-and-repeat exposure, there occurs the disadvantage that the exposure cannot be effected with accuracy.

The present invention has been made on the basis of such circumstances, and provides a liquid crystal display device provided with a driver circuit capable of fully coping with an increase in the number of pixels per liquid crystal display device.

SUMMARY OF THE INVENTION

The outline of a representative aspect of the invention disclosed herein will be described below in brief.

A liquid crystal display device according to the present invention basically has signal lines for driving individual pixels and a driver circuit connected to the signal lines, on a liquid-crystal-side surface of either one of substrates disposed to oppose each other with a liquid crystal interposed therebetween. The driver circuit includes a film substrate, interconnection layers formed on a surface of the film substrate, and a semiconductor chip mounted on the film substrate. Some of the interconnection layers are connected to the bumps of the semiconductor chip, and then run under the semiconductor chip and extend to the periphery of the film substrate.

In the liquid crystal display device constructed in this manner, the interconnection layers which lead out the bumps of the semiconductor chip are formed in the area of the film substrate on which the semiconductor chip is mounted, whereby even if multiple bumps are formed on a semiconductor chip having a limited size, the bumps can be fully led out via the interconnection layers.

BRIEF DESCRIPTION OF THE DRAWINGS

Preferred embodiments of the liquid crystal display device according to the present invention will be described below in detail with reference to the following drawings, wherein.

DETAILED DESCRIPTION OF THE PREFERRED EMBODIMENTS

Preferred embodiments of the liquid crystal display device according to the present invention will be described below with reference to the accompanying drawings.

Embodiment 1

Figure 2:
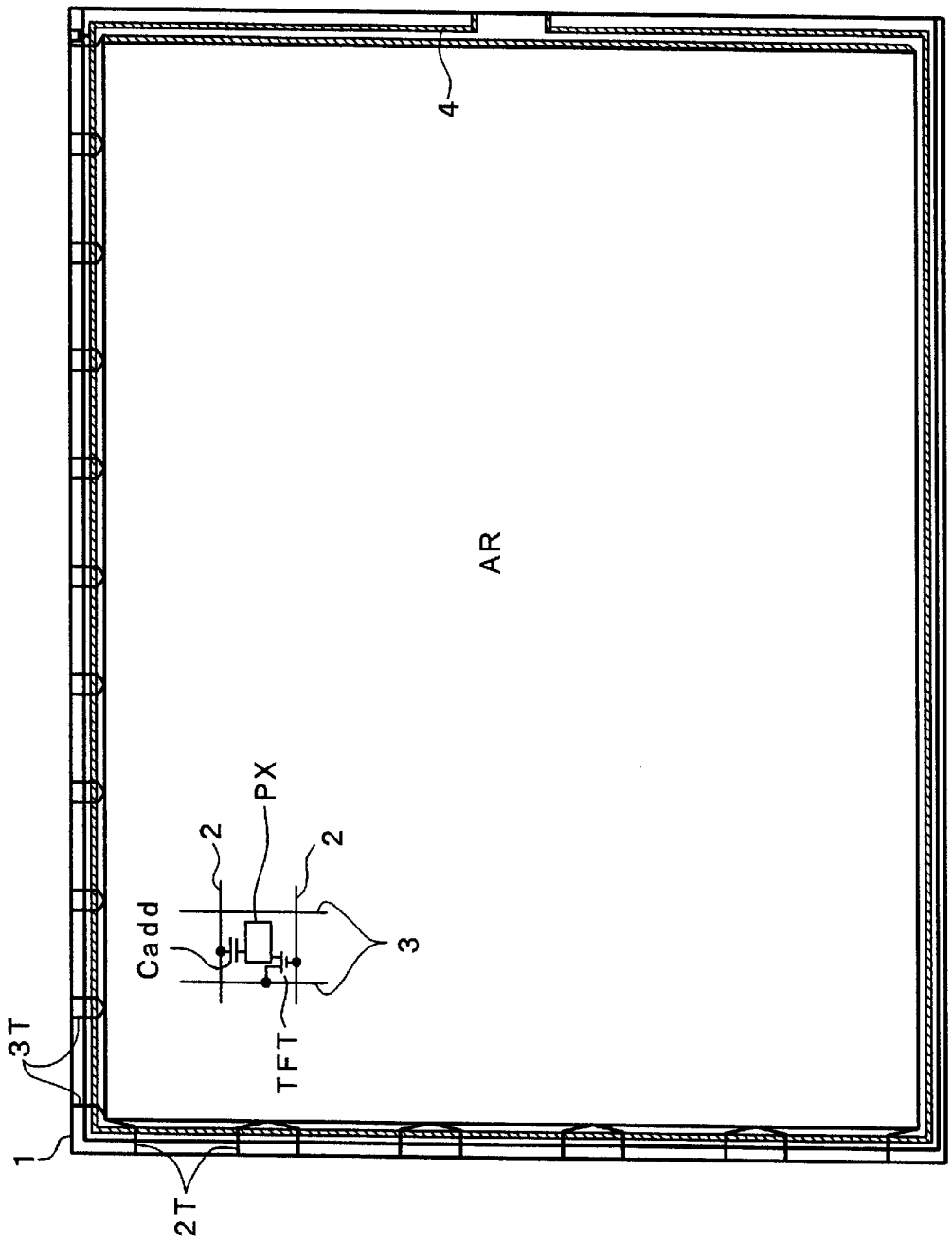
FIG. 2 is a plan view showing one embodiment of the construction of the liquid-crystal-side surface of a TFT substrate which constitutes the liquid crystal display device according to the present invention.

FIG. 2 is a plane view showing the liquid-crystal-side surface of a so-called TFT substrate 1 which is one of transparent substrates disposed to oppose each other with a liquid crystal interposed therebetween.

Gate signal lines 2 which are disposed to be extended in the x direction and to be juxtaposed in the y direction are formed over the liquid-crystal-side surface of the TFT substrate 1, and drain signal lines 3 which are disposed to be extended in the y direction and to be juxtaposed in the x direction are formed over the same surface in the state of being insulated from the gate signal lines 2.

The area surrounded by these gate signal lines 2 and drain signal lines 3 constitutes a pixel area, and a thin film transistor TFT and a pixel electrode PX is formed in this pixel area. The thin film transistor TFT is turned on by the supply of a scanning signal from one of the gate signal lines 2, and a video signal is supplied to the pixel electrode PX from one of the drain signal lines 3 via this thin film transistor TFT.

This pixel electrode PX is made of a transparent electrode which is formed in nearly the whole portion of the pixel area, and an electric field is generated between the pixel electrode PX and a common electrode (transparent substrate) formed in common to each pixel area over the liquid-crystal-side surface of a so-called filter substrate which is disposed to oppose the TFT substrate 1 with the liquid crystal interposed therebetween.

A capacitance element Cadd is formed between the pixel electrode PX and the other gate signal lines 2, and when the thin film transistor TFT is turned off, a video signal is stored in the pixel electrode PX for a comparatively long time.

Each of the gate signal lines 2 is formed to be extended beyond a sealing material 4 which serves to secure the filter substrate and to seal the liquid crystal, to the periphery of the TFT substrate 1 to constitute a gate signal terminal 2T.

In this case, mutually adjacent ones of the gate signal lines 2 are grouped, and each of the grouped gate signal lines 2 is extended to the periphery of the TFT substrate 1 in such a manner that their separation width is converged toward the periphery.

One of the output bumps of a scanning signal driver circuit is connected to the gate signal terminal 2T of each of the grouped gate signal lines 2, and the pitch of the output bumps of the scanning signal driver circuit is formed to be narrower than the pitch of the gate signal lines 2.

Each of the drain signal lines 3 is formed to be extended beyond the sealing material 4 to the periphery of the TFT substrate 1 to constitute a drain signal terminal 3T.

Mutually adjacent ones of the drain signal lines 3 are grouped, and each of the grouped drain signal lines 3 is extended to the periphery of the TFT substrate 1 in such a manner that their separation width is converged toward the periphery.

One of the output bumps of a video signal driver circuit is connected to the drain signal terminal 3T of each of the grouped drain signal lines 3, and the pitch of the output bumps of the video signal driver circuit is formed to be narrower than the pitch of the drain signal lines 3.

Figure 3:
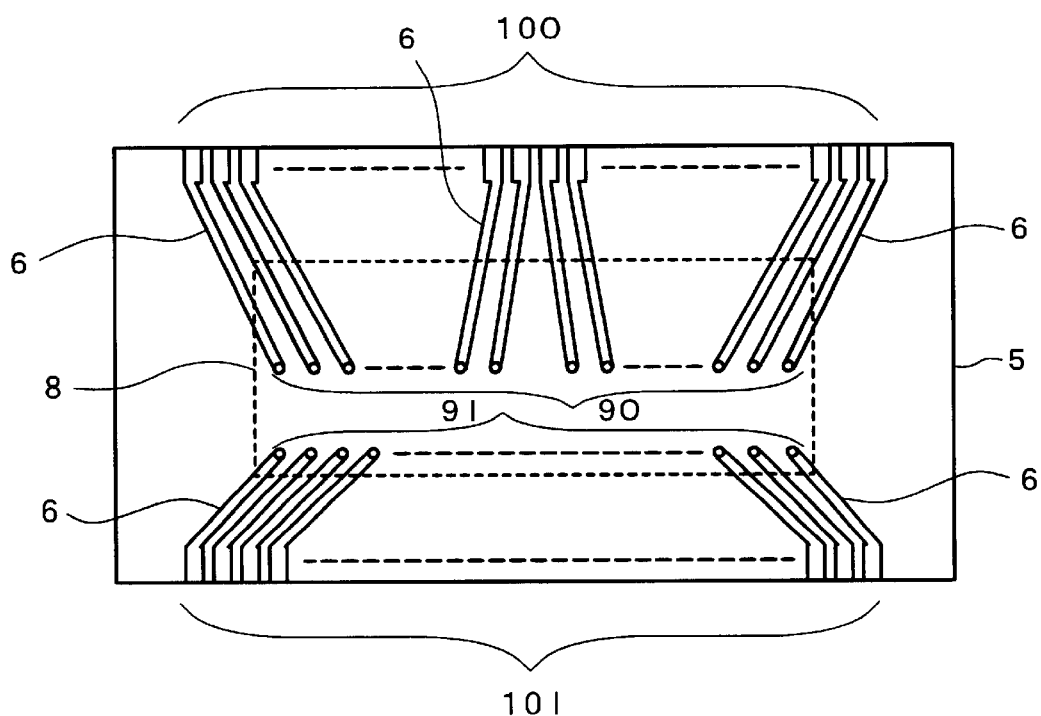
FIG. 3 is a plan view showing one embodiment of the video signal driver circuit of the liquid crystal display device according to the present invention.

FIG. 3 is a plane view showing one example of the video signal driver circuit.

In FIG. 3, there is shown a film substrate 5, and interconnection layers 6 are formed on a surface of the film substrate 5.

These interconnection layers 6 are intended to lead the bumps of a semiconductor chip 8 mounted on the film substrate 5 to the periphery of the film substrate 5, and the interconnection layers 6 are partly formed to be extended into an area in which the semiconductor chip 8 is mounted (the area surrounded by dashed lines in FIG. 3)

Specifically, in the semiconductor chip 8, input bumps 9I are disposed to be juxtaposed along one longer side of the semiconductor chip 8, while output bumps 9O are disposed to be juxtaposed in parallel with the input bumps 9I between the one longer side and the other longer side opposite thereto.

The input bumps 9I juxtaposed along the one longer side of the semiconductor chip 8 are led toward one longer side of the film substrate 5 that is adjacent to the input bumps 9I, and are connected to input terminals 10I. The output bumps 9O juxtaposed approximately in the middle of the semiconductor chip 8 are led toward the other longer side of the film substrate 5 opposite to the one longer side, and are connected to output terminals 10O.

Incidentally, in this embodiment, the input terminals 10I and the output terminals 10O are formed on the surface of the film substrate 5 on which the semiconductor chip 8 is mounted. However, it goes without saying that the input terminals 10I and/or the output terminals 10O may be formed via through-holes or the like on the surface of the film substrate 5 opposite to the surface on which the semiconductor chip 8 is mounted.

Figure 1:
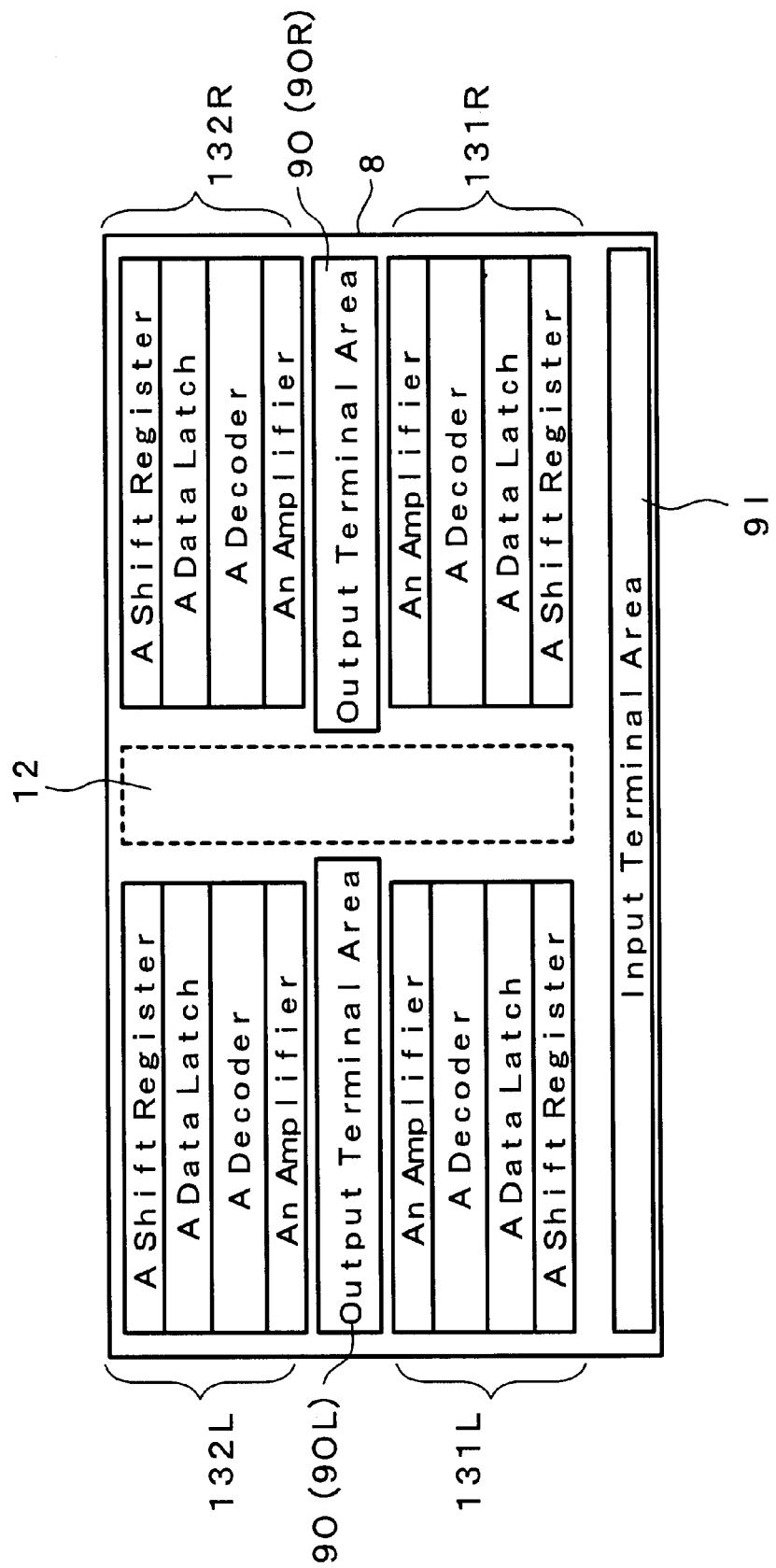
FIG. 1 is an explanatory view illustrating one embodiment of a semiconductor chip mounted on a video signal driver circuit of a liquid crystal display device according to the present invention.

The semiconductor chip 8 is constructed as shown in FIG. 1. FIG. 1 is a view showing the semiconductor chip 8 as viewed from a side on which no bumps are formed (therefore, a view showing the semiconductor chip 8 as viewed in the same direction that the semiconductor chip 8 is viewed in FIG. 3.

The input bumps 9I are juxtaposed in the input terminal area of the semiconductor chip 8 that lies on the one longer side, and the output bumps 9O are juxtaposed in parallel with the input bumps 9I in an output terminal area that lies approximately in the middle between the one longer side and the other longer side opposite thereto.

In this case, the juxtaposition of the output bumps 9O is divided in the middle of the semiconductor chip 8. A gray scale generation voltage circuit 12 is incorporated in the division area.

In this embodiment, for the sake of convenience, the output bumps that lie on the left side of the division area are called L; output bumps, 9OL, while the output bumps that lie on the right side of the division area are called R; output bumps, 9OR.

First L circuit 131L and second L circuit 132L are respectively incorporated in areas where the L output bumps 9OL are interposed, and each of first L circuit 131L and second L circuit 132L includes a shift register, a data latch, a decoder and an amplifier which are arranged in that order from the location farthest from the L output bumps 9OL.

First R circuit 131R and second R circuit 132R are respectively incorporated in areas where the R output bumps 9OR are interposed, and each of the first R circuit 131R and the second R circuit 132R includes a shift register, a data latch, a decoder and an amplifier which are arranged in that order from the location farthest from the R output bumps 9OR.

Signals from the input bumps 9I are inputted to the scale generation voltage circuit 12, and the output from the scale generation voltage circuit 12 drives the shift register, the data latch, the decoder and the amplifier of each of the first L circuit 131L and the second L circuit 132L, the first R circuit 131R and the second R circuit 132R. The outputs from the first L circuit 131L and the second L circuit 132L are conducted to the L output bumps 9OL, while the outputs from the first R circuit 131R and the second R circuit 132R are conducted to the R output bumps 9OR.

This circuit is constructed so that the circuits from the input bumps 9I to the output bumps 9O are arranged rationally in terms of the interconnection layers.

It goes without saying that since the input bumps 9I and the output bumps 9O are formed to be concentrated in particular areas of a main surface of the semiconductor chip 8, so-called dummy bumps may also be formed on the other longer side opposite to the one longer side on which the input bumps 9I are formed, as viewed in FIG. 1.

The dummy bumps are not connected to any of the internal circuits of the semiconductor chip 8 (and therefore, are not led by the interconnection layers 6), and are formed similarly to the other bumps. The dummy bumps make it possible to stabilize the mounting (bonding) of the semiconductor chip 8 on the film substrate 5.

In addition, the video signal driver circuit constructed in this manner enables the input bumps 9I and the output bumps 9O of the semiconductor chip 8 to be increased in number according to an increase in the number of pixels per device.

Figures 4A, 4B, 4C:
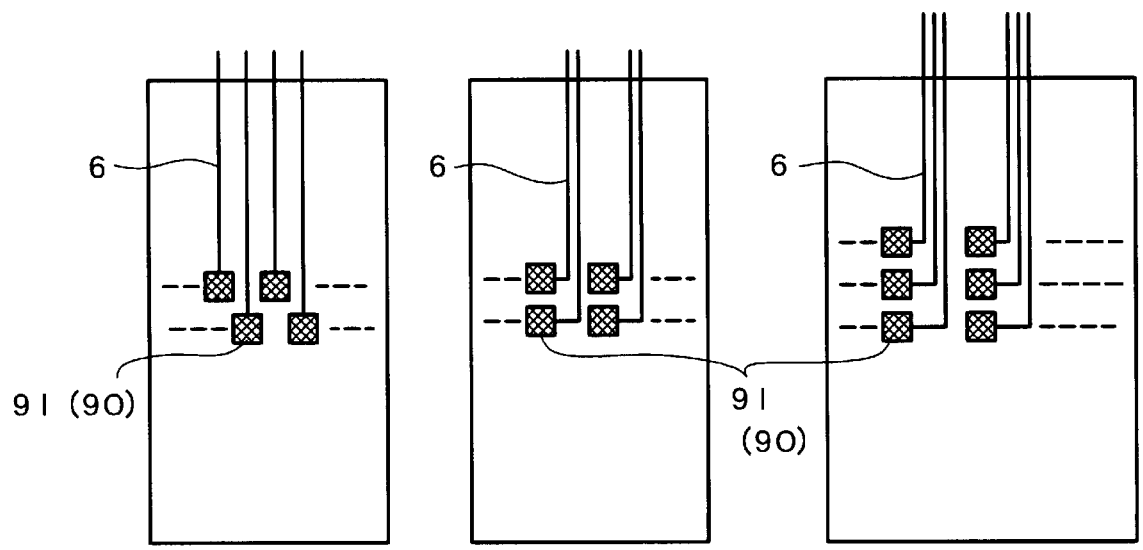
FIGS. 4A to 4C are explanatory views showing the manner of juxtaposition of bumps of a semiconductor chip mounted on the video signal driver circuit of the liquid crystal display device according to the present invention.

Therefore, it goes without saying that the input bumps 9I and the output bumps 9O of the semiconductor chip 8 may also be arranged in multiple rows as shown in FIGS. 4A to 4C.

FIG. 4A shows the case in which bumps are juxtaposed in two rows so that the two rows of bumps are staggered. In this case, it is possible to achieve the advantage of increasing the separation distance between each of the interconnection layers connected to the respective bumps.

Moreover, in the description of this embodiment, reference has been made to the video signal driver circuit. However, since conditions are the same in the scanning signal driver circuit as well, the present invention can, of course, be applied to this scanning signal driver circuit.

Embodiment 2

Figure 5:
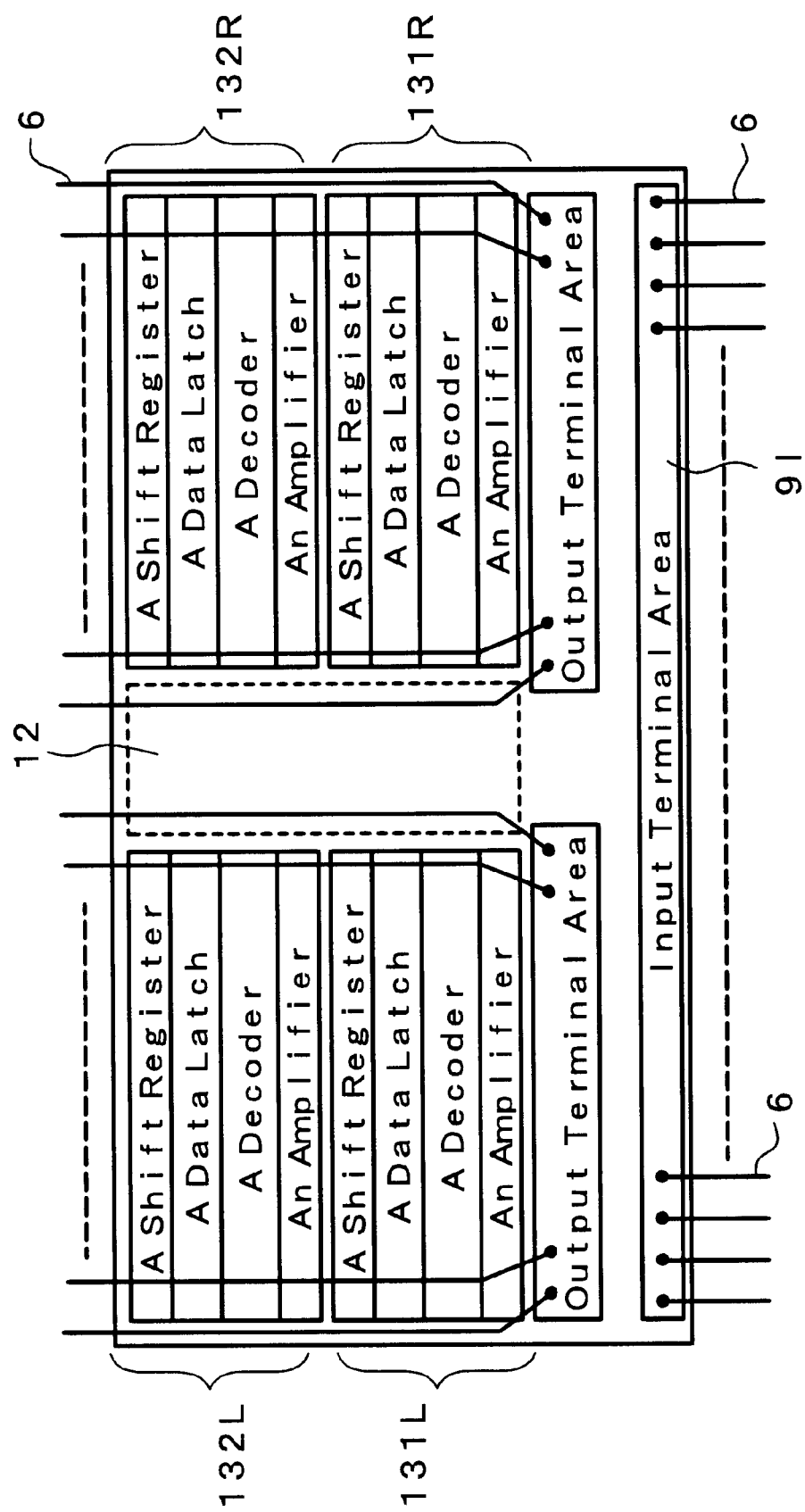
FIG. 5 is an explanatory view showing another embodiment of the semiconductor chip mounted on the video signal driver circuit of the liquid crystal display device according to the present invention.

FIG. 5 is a view showing another embodiment of the liquid crystal display device according to the present invention. FIG. 5 is a view corresponding to FIG. 1, and also shows the interconnection layers 6 which lie over the film substrate 5.

The construction shown in FIG. 5 differs from that shown in FIG. 1 in that the output bumps 9O are formed in proximity to and in parallel with the input bumps 9I and the gray scale generation voltage circuit 12, the first L circuit 131L, the second L circuit 132L, the first R circuit 131R and the second R circuit 132R are formed in the remaining area.

In this case as well, it is possible to adopt a construction approximately similar to the embodiment.

In this case, dummy bumps may also be formed on the other longer side opposite to the one longer side on which the input bumps 9I are formed.

Since an area in which the dummy bumps are formed is an area in which the interconnection layers 6 to be connected to the output bumps 9O are formed, the number of the dummy bumps may be decreased in such a way that the dummy bumps are formed to avoid locations where the respective interconnection layers 6 are formed.

Embodiment 3

Figure 6:
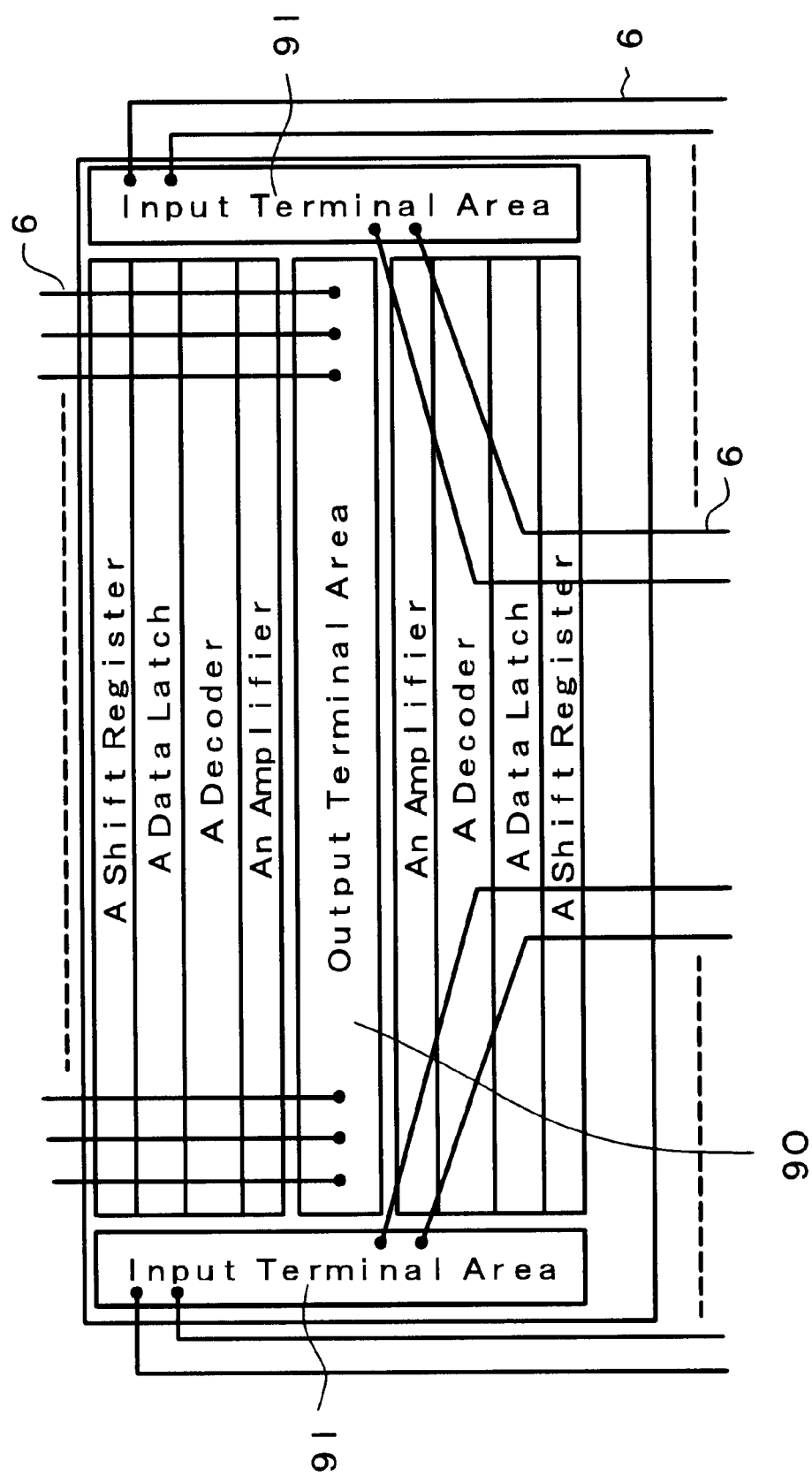
FIG. 6 is an explanatory view showing another embodiment of the semiconductor chip mounted on the video signal driver circuit of the liquid crystal display device according to the present invention.

FIG. 6 is a view showing another embodiment of the liquid crystal display device according to the present invention. FIG. 6 is a view corresponding to FIG. 1, and also shows the interconnection layers 6 which lie over the film substrate 5.

The construction shown in FIG. 6 differs from that shown in FIG. 1 in that the input bumps 9I are formed on the opposite lateral sides of the semiconductor chip.

Some of the interconnection layers 6 connected to the respective input bumps 9I are disposed outside an area where the semiconductor chip 8 is mounted, while the other interconnection layers 6 are disposed inside the area.

Accordingly, the longer sides of the video signal driver circuit (the longer sides of the film substrate 5) can be prevented from increasing in length.

In this case, although not shown in FIG. 12, the scale generation voltage circuit 12 can be disposed at a location such as the area between each of areas in which the input bumps 9I are formed and circuits each made of a shift register, a data latch, a decoder and an amplifier.

Embodiment 4

Figure 7:
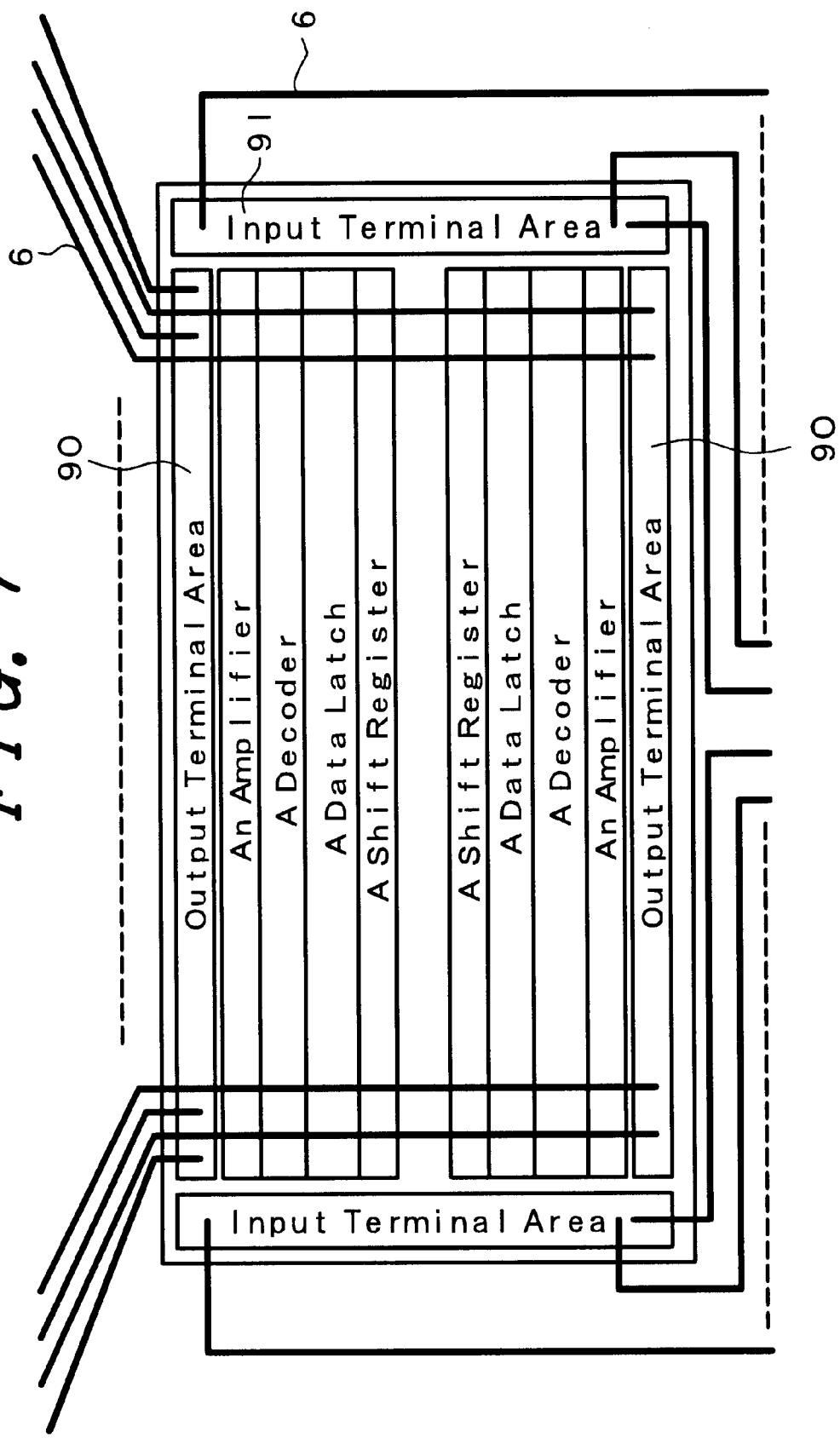
FIG. 7 is an explanatory view showing another embodiment of the semiconductor chip mounted on the video signal driver circuit of the liquid crystal display device according to the present invention.

FIG. 7 is a view showing another embodiment of the liquid crystal display device according to the present invention. FIG. 7 is a view corresponding to FIG. 1, and also shows the interconnection layers 6 which lie over the film substrate 5.

The construction shown in FIG. 7 differs from that shown in FIG. 1 in that the input bumps 9I are disposed on the opposite lateral sides of the semiconductor chip 8, while the output bumps 9O are disposed on the other sides of the semiconductor chip 8.

In this case, the direction in which the respective interconnection layers 6 connected to the input bumps 9I are led is opposite to the direction in which the respective interconnection layers 6 connected to the output bumps 9O are led.

Embodiment 5

Figure 8:
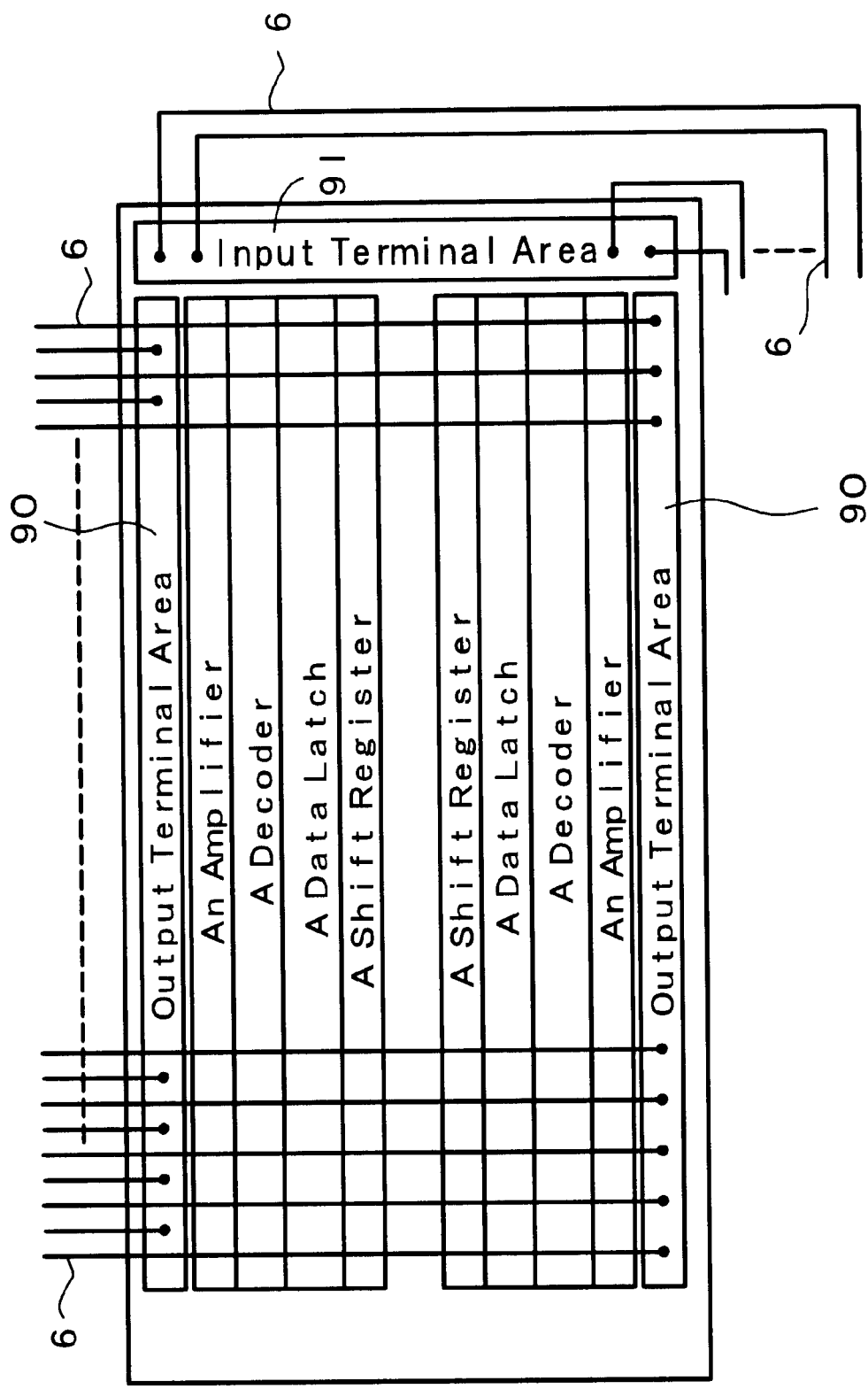
FIG. 8 is an explanatory view showing another embodiment of the semiconductor chip mounted on the video signal driver circuit of the liquid crystal display device according to the present invention.

FIG. 8 is a view showing another embodiment of the liquid crystal display device according to the present invention. FIG. 8 is a view corresponding to FIG. 7, and also shows the interconnection layers 6 which lie over the film substrate 5.

The construction shown in FIG. 8 differs from that shown in FIG. 7 in that the input bumps 9I are disposed on either one of the opposite lateral sides of the semiconductor chip 8.

This embodiment is effective in a case where the number of the output bumps 9O is extremely larger than that of the input bumps 9I.

All the interconnection layers 6 that are led from the respective output bumps 9O are formed to be extended in one direction, and the interconnection layers 6 which are led from the respective bumps 9O lying on one longer side and the interconnection layers 6 which are led from the respective bumps 9O lying on the other longer side are alternately arranged in an area in which the semiconductor chip 8 is mounted.

Embodiment 6

Figure 9:
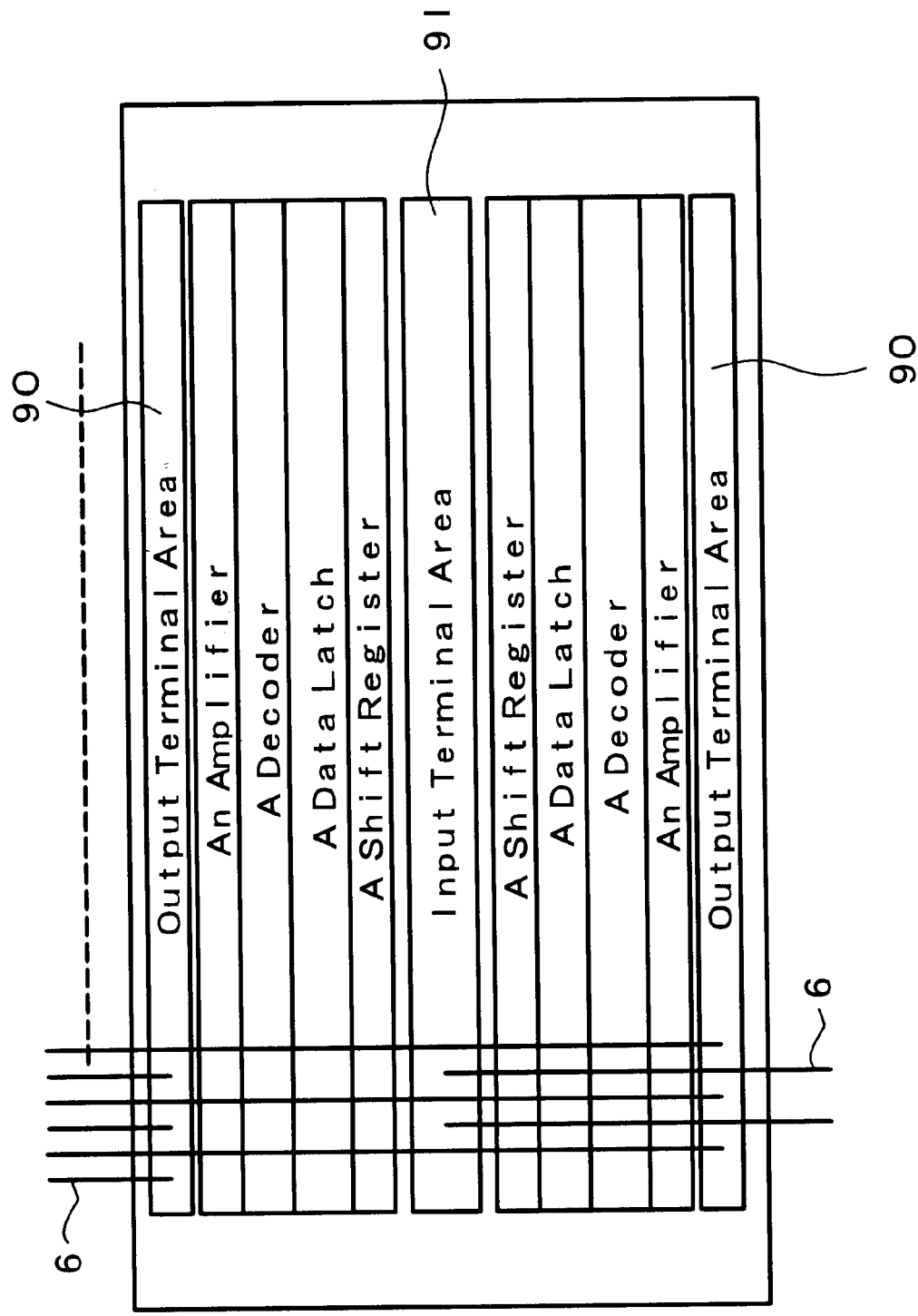
FIG. 9 is an explanatory view showing another embodiment of the semiconductor chip mounted on the video signal driver circuit of the liquid crystal display device according to the present invention.

FIG. 9 is a view showing another embodiment of the liquid crystal display device according to the present invention. FIG. 9 is a view corresponding to FIG. 1, and also shows the interconnection layers 6 which lie over the film substrate 5.

The construction shown in FIG. 9 differs from that shown in FIG. 1 in that the output bumps 9O are disposed on one longer side of the semiconductor chip 8 and on the other longer side opposite to the one longer side and the input bumps 9I are disposed in parallel with the output bumps 9O at an intermediate position between the opposite longer sides on which the output bumps 9O are disposed.

The interconnection layers 6 which are led from the respective bumps 9O are disposed to be extended in one direction, and the interconnection layers 6 which are led from the respective output bumps 9O lying on one longer side and the interconnection layers 6 which are led from the respective bumps 9O lying on the other longer side are alternately arranged, whereby the interconnection layers 6 connected to the respective input bumps 9I are disposed in a comparatively large area.

Incidentally, it goes without saying that in the above-described Embodiments 2 to 6, the bumps need not be juxtaposed in one row, and may be arranged in multiple rows as shown in FIGS. 4A to 4C, as required.

As is apparent from the foregoing description, the liquid crystal display device according to the present invention can be provided with a driver circuit which can fully cope with an increase in the number of pixels per device.

What is claimed is:

1. A liquid crystal display device comprising:

a liquid crystal panel;

a signal line formed on the liquid crystal panel;

a film substrate connected to the signal line;

an output terminal of the film substrate electrically connected with the signal line;

an interconnection layer formed on the film substrate;

a semiconductor chip mounted on the film substrate and having first and second longer sides which are longer than other sides of the semiconductor chip;

input bumps juxtaposed along the first longer side of the semiconductor chip;

a first circuit formation area formed along the second longer side of the semiconductor chip opposed to the first longer side; and output bumps formed between the first circuit formation area and the input bumps;

wherein the interconnection layer is connected to bump of the output bumps of the semiconductor chip and the output terminal of the film substrate, and is formed over the first circuit formation area.

2. A liquid crystal display device comprising:

a liquid crystal display element;

plural signal lines formed on the liquid crystal display element;

a film substrate connected to the plural signal lines;

interconnection lines formed on the film substrate;

a semiconductor chip mounted on the film substrate and having first and second longer sides which are longer than other sides of the semiconductor chip;

input bumps juxtaposed along the first longer side of the semiconductor chip;

the semiconductor chip having a driver circuit which supplies signals to the plural signal lines;

a first driver circuit formation area formed along the second longer side of the semiconductor chip opposed to the first longer side;

output bumps of the semiconductor chip formed between the first driver circuit formation area and the input bumps; and a second driver circuit formation area formed between the input bumps and the output bumps;

wherein the interconnection lines connect the output bumps of the semiconductor chip and the plural signal lines, and are formed over the first driver circuit formation area.

3. A liquid crystal display device according to claim 2, wherein one circuit selected from among a shift register, a data latch, a decoder and an output amplifier is formed in the first driver circuit formation area of the semiconductor chip.

4. A liquid crystal display device according to claim 1, wherein the semiconductor chip has a second circuit formation area formed between the input bumps and the output bumps.

5. A liquid crystal display device according to claim 1 or 2, wherein a dummy bump is formed on the semiconductor chip.

6. A liquid crystal display device comprising:

a liquid crystal display element;

plural signal lines formed on the liquid crystal display element;

a film substrate connected to the liquid crystal display element;

interconnection lines formed on the film substrate and connected to the plural signal lines; and a semiconductor chip mounted on the film substrate;

wherein the semiconductor chip has a first side and a second side which are opposed to each other, a first driver circuit formed adjacent the first side, and a second driver circuit formed adjacent the second side;

output bumps of the semiconductor chip formed between the first driver circuit and the second driver circuit; and interconnection lines connected to the output bumps of the semiconductor chip and the plural signal lines, and being formed over an area where the first driver circuit is formed.

* * * * *